United States Patent [19]

Tomita et al.

[11] Patent Number: 5,373,496
[45] Date of Patent: Dec. 13, 1994

[54] OBJECTIVE LENS ACTUATOR HAVING RODLIKE ELASTIC MEMBERS SUPPORTING U-SHAPED LENS HOLDER

[75] Inventors: Hironori Tomita; Tohru Nakamura, both of Katano; Atsufumi Ishizuka, Tokyo, all of Japan

[73] Assignee: Matsushita Electric Industrial Co., Ltd., Osaka, Japan

[21] Appl. No.: 969,963

[22] Filed: Nov. 2, 1992

[51] Int. Cl.$^5$ .............................................. G11B 7/08
[52] U.S. Cl. ............................... 369/219; 369/44.15
[58] Field of Search ............. 369/219, 244, 247, 250, 369/253, 255, 44.15, 44.16; 359/813, 814, 823, 824; 248/475.1

[56] References Cited

U.S. PATENT DOCUMENTS

| | | | |
|---|---|---|---|
| 4,794,580 | 12/1988 | Ikedo et al. | 369/44.16 |
| 4,960,321 | 10/1990 | Takahashi | 369/44.15 |
| 5,128,806 | 7/1992 | Ohno | 369/44.15 |

FOREIGN PATENT DOCUMENTS

| | | | |
|---|---|---|---|
| 486275A2 | 5/1992 | European Pat. Off. | 369/44.15 |
| 59-124042 | 7/1984 | Japan | 369/44.15 |
| 63-144431 | 6/1988 | Japan | 369/44.15 |
| 1-220136 | 9/1989 | Japan. | |
| 2132034 | 6/1984 | United Kingdom | 369/44.16 |

Primary Examiner—John H. Wolff
Assistant Examiner—Kevin M. Watkins
Attorney, Agent, or Firm—Wenderoth, Lind & Ponack

[57] ABSTRACT

An objective lens actuator drives an objective lens in a radial direction of a disklike recording medium parallel to a face of the recording medium and in a direction of an optical axis vertical to the face of the recording medium such that information can be optically written on or read from the recording medium. The objective lens actuator includes a substantially U-shaped lens holder at an approximately central portion of which the objective lens is supported, a pair of drive members for driving the lens holder, which are provided at opposite end portions of the lens holder, respectively, a base member, and four rodlike elastic members supporting the lens holder. Each of the elastic members has one end fixed to the base member. The other end of each of two of the elastic members is fixed to a distal portion of a first leg of the lens holder adjacent the base member. The other end of each of the other two elastic members is fixed to a proximal portion of a second leg of the lens holder remote from the base member.

3 Claims, 6 Drawing Sheets

OBJECTIVE LENS ACTUATOR HAVING RODLIKE ELASTIC MEMBERS SUPPORTING U-SHAPED LENS HOLDER

BACKGROUND OF THE INVENTION

The present invention relates to an objective lens actuator of an optical disk device for optically writing or reading information on a disklike recording medium.

In a known optical disk device, an objective lens is driven in two directions, i.e. along a vertical optical axis perpendicular to a face of a disklike recording medium (hereinbelow, referred to as a "focusing direction F") and along a radial direction parallel to the face of the recording medium (hereinbelow, referred to as a "tracking direction T") so as to correct focusing error resulting from vertical motion of the recording medium due to its warpage and tracking error due to radial deviations of the disc, etc. such that recording and reproduction are performed optically.

In recent years, trends towards portable use and personal use of a compact disk player or a data file device employing an optical disk are gaining momentum and thus, an optical pickup for use in the compact disk player or the data file device is also required to be made more compact, especially less thick.

FIGS. 1 to 3 show one example of an known objective lens actuator of the optical pickup. The known objective lens actuator includes an objective lens 1, a lens holder 2 for holding the objective lens 1, a pair of permanent magnets 3a and 3b, wires 4a to 4d for supporting the lens holder 2 and a pair of magnetic yokes 5a and 5b. A magnetic circuit is formed by the permanent magnets 3a and 3b and the magnetic yokes 5a and 5b.

The known objective lens actuator further includes a tracking coil 6 wound vertically around the lens holder 2, a focusing coil 7 wound horizontally around the lens holder 2, a stationary member 8, a base 9 and a reflective mirror 10 for guiding to the objective lens 1 a light beam emitted from a laser diode (not shown) acting as a light source. One end of each of the wires 4a to 4d is attached to the stationary member 8, while the other end of each of the wires 4a to 4d is secured to the lens holder 2 such that the wires 4a to 4d extend parallel to each other. The permanent magnets 3a and 3b, the magnetic yokes 5a and 5b, the stationary member 8 and the reflective mirror 10 are fixed to the base 9. A movable member is constituted by the objective lens 1, the lens holder 2, the tracking coil 6 and the focusing coil 7.

The operation of the known objective lens actuator is described hereinbelow. In order to correct a focusing error resulting from vertical motion of the recording medium due to its warpage or tracking error due to radial deviations in the disc, etc., the objective lens 1 is driven in the focusing direction F and the tracking direction T as follows. The lens holder 2 carrying the objective lens 1 is supported by the wires 4a to 4d. A light beam emitted from the laser diode is guided by the reflective mirror 10 so as to be incident upon the objective lens 1.

In an electrokinetic type of focusing transducer, the focusing coil 7 is disposed in a gap of the magnetic circuit formed by the permanent magnets 3a and 3b and the magnetic yokes 5a and 5b. In order to drive the objective lens 1 in the focusing direction F, the lens holder 2 carrying the objective lens 1 is translated through the wires 4a to 4d by the focusing transducer.

Likewise, in an electrokinetic type tracking transducer, the tracking coil 6 is disposed in the gap of the magnetic circuit formed by the permanent magnets 3a and 3b and the magnetic yokes 5a and 5b. In order to drive the objective lens 1 in the tracking direction T, the lens holder 2 carrying the objective lens 1 is translated through the wires 4a to 4d by the tracking transducer. In addition, the known objective lens actuator as a whole is driven by a motor (not shown) in an access direction Ac on the recording medium. The access direction Ac is the same as the tracking direction T.

Meanwhile, the objective lens 1 is mounted on the lens holder 2 outside, in the tracking direction T, of an available magnetic field of the magnetic circuit formed by the permanent magnets 3a and 3b and the magnetic yokes 5a and 5b. Outside the available magnetic field of the magnetic circuit, the lens holder 2 has a thickness t1 in the focusing direction F at its portion where the objective lens 1 is mounted as shown in FIG. 2. On the other hand, in the available magnetic field of the magnetic circuit, the lens holder 2 has a thickness t2 in the focusing direction F such that the thickness t1 is smaller than the thickness t2. As a result, the objective lens 1 can be brought closer to the reflective mirror 10 and thus, the known objective lens actuator as a whole can have a relatively small thickness.

However, in the above-described objective lens actuator, the objective lens is disposed outside the available magnetic field of the magnetic circuit in order to make the optical head thinner. Therefore, the center of the driving force for driving the lens holder is offset from the center of the objective lens. The frequency response in the focusing direction is adversely affected by the deviation of the center of the driving force from center of gravity of the movable member.

SUMMARY OF THE INVENTION

Accordingly, an essential object of the present invention is to provide an objective lens actuator in which not only is the optical head thin as a whole but the actuator also has a stable frequency response.

In order to accomplish this object of the present invention, there is provided an objective lens actuator in which an objective lens is fixed to an approximately central portion of a substantially U-shaped lens holder and a pair of drive members for driving the lens holder are provided at opposite end portions of the lens holder, respectively. A movable member is constituted by the objective lens and the lens holder.

Because the lens holder can be made thin in the vicinity of its portion where the objective lens is mounted, the optical head as a whole can be thin. Furthermore, because the center of the driving force is coincident with that of the objective lens, the objective lens actuator is free from adverse effects which occur when the center of the driving force deviated from the center of gravity of the movable member, e.g. has a stable frequency response.

Further, a plurality of rodlike elastic members are attached to the lens holder so as to support the lens holder. Positions at which the elastic members are attached to the lens holder may be offset in the longitudinal direction of the elastic members so that forces for restraining rotations of the movable member about axes parallel to the focusing direction and the tracking direction are increased and the optical head as a whole can be made thinner. In addition, the objective lens actuator has a stable frequency response free from parasitic resonance.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
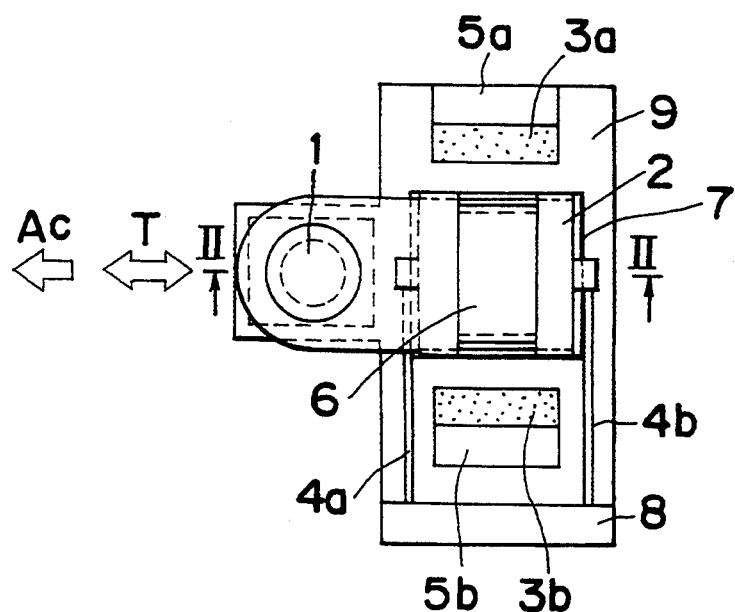
FIG. 1 is a top plan view of a prior art objective lens actuator (already referred to)
Figure 2:
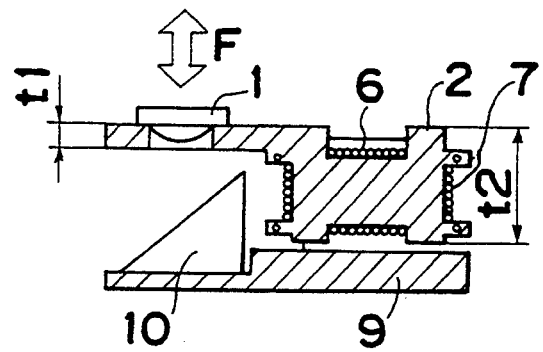
FIG. 2 is a sectional view taken along line II—II in FIG. 1 (already referred to)
Figure 3:
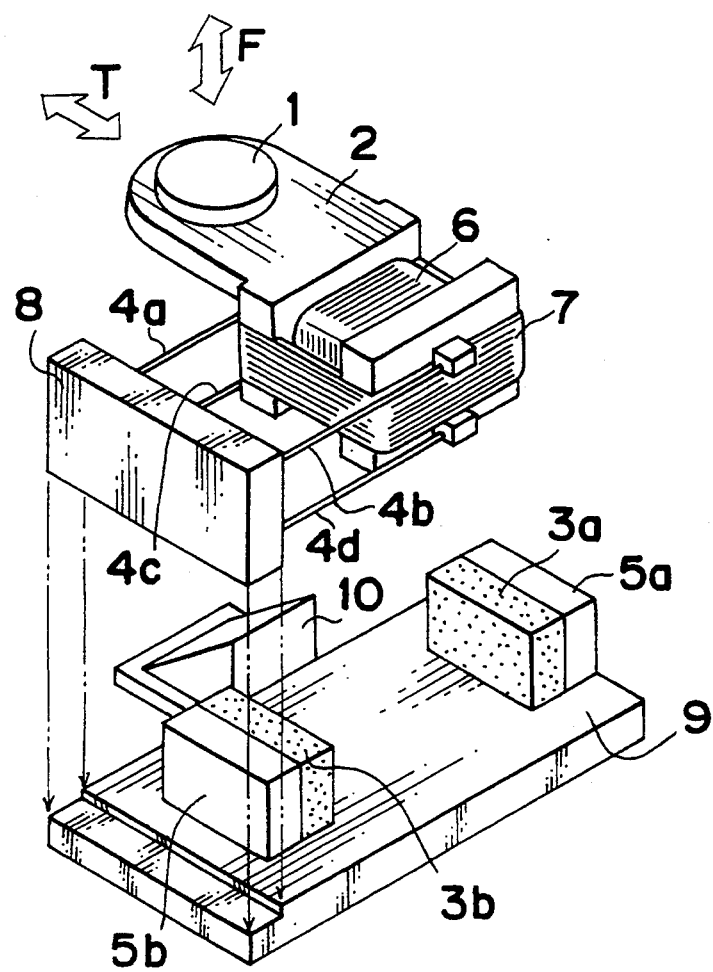
FIG. 3 is an exploded perspective view of the prior art objective lens actuator of FIG. 1 (already referred to)
Figure 4:
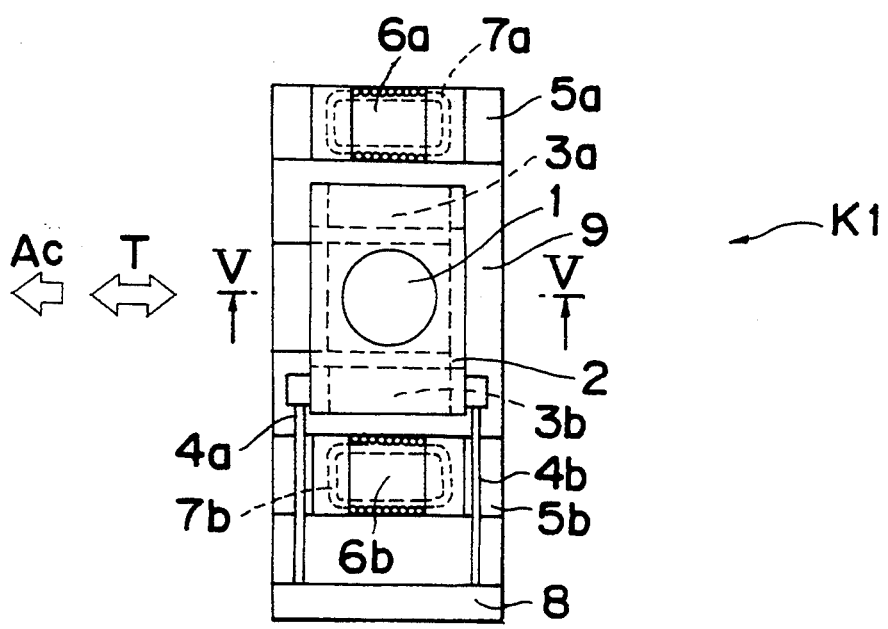
FIG. 4 is a top plan view of a first embodiment of an objective lens actuator according to the present invention.
Figure 5:
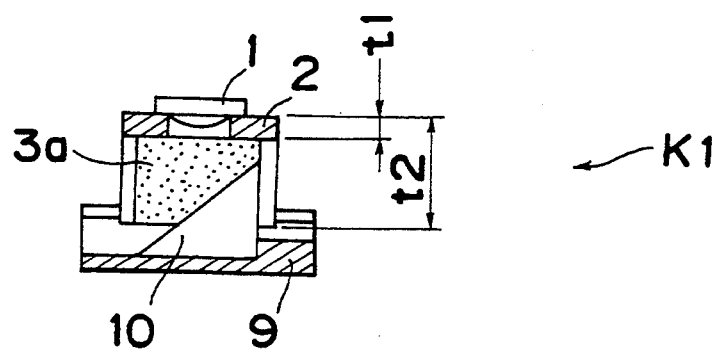
FIG. 5 is a sectional view taken along line V—V in FIG. 4.
Figure 6:
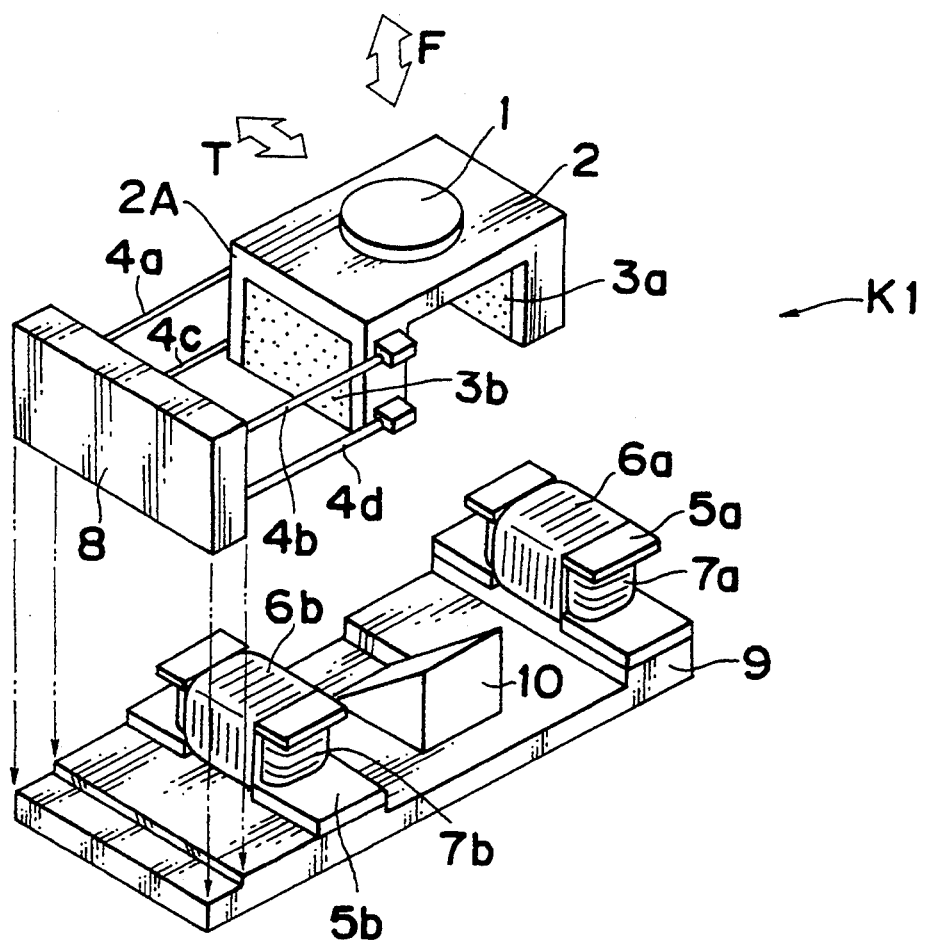
FIG. 6 is an exploded perspective view of the objective lens actuator of FIG. 4.

Referring now to the drawings, there is shown in FIGS. 4 to 6, a first embodiment of an objective lens actuator K1 according to the present invention. The objective lens actuator K1 includes an objective lens 1, a substantially U-shaped lens holder 2 for holding the objective lens 1, a pair of permanent magnets 3a and 3b, wires 4a to 4d for supporting the lens holder 2 and a pair of magnetic yokes 5a and 5b. The permanent magnets 3a and 3b are fixed to opposite end portions of the lens holder 2, respectively. A magnetic circuit is formed by the permanent magnets 3a and 3b and the magnetic yokes 5a and 5b.

The objective lens actuator K1 further includes a pair of tracking coils 6a and 6b, a pair of focusing coils 7a and 7b, a platelike stationary member 8, a base 9 and a reflective mirror 10 for guiding to the objective lens 1 a light beam emitted from a laser diode (not shown) acting as a light source. The focusing coils 7a and 7b are horizontally wound around the magnetic yokes 5a and 5b, respectively, while the tracking coils 6a and 6b are vertically wound around the focusing coils 7a and 7b, respectively. One end of each of the wires 4a to 4d is attached to the stationary member 8, while the other end of each of the wires 4a to 4d is secured to the lens holder 2 such that the wires 4a to 4d extend parallel to each other. The lens holder 2 has one end 2A confronting the platelike stationary member 8. It is to be noted that the positions at which the wires 4a to 4d are attached to the lens holder 2 are spaced an identical distance from the end 2A. The magnetic yokes 5a and 5b, the stationary member 8 and the reflective mirror 10 are fixed to the base 9. A movable member is constituted by the objective lens 1 and the lens holder 2.

The operation of the objective lens actuator K1, in which the objective lens 1 is driven in a focusing direction F and a tracking direction T, is described hereinbelow. The lens holder 2 carrying the objective lens 1 is supported by the wires 4a to 4d. A light beam emitted from the laser diode is guided by the reflective mirror 10 so as to be incident upon the objective lens 1.

In an electrokinetic type focusing transducer, each of the focusing coils 7a and 7b is disposed in a gap of the magnetic circuit formed by the permanent magnets 3a and 3b and the magnetic yokes 5a and 5b. In order to drive the objective lens 1 in the focusing direction F, the lens holder 2 carrying the objective lens 1 is translated through the wires 4a to 4d by the focusing transducer.

Similarly, in an electrokinetic type tracking transducer, each of the tracking coils 6a and 6b is disposed in a gap of the magnetic circuit formed by the permanent magnets 3a and 3b and the magnetic yokes 5a and 5b. In order to drive the objective lens 1 in the tracking direction T, the lens holder 2 carrying the objective lens 1 is translated through the wires 4a to 4d by the tracking transducer. Moreover, the objective lens actuator K1 as a whole is driven by a motor (not shown) in an access direction Ac on a recording-medium. As shown in FIG. 4, the access direction Ac is the same as the tracking direction T.

As shown in FIG. 5, the lens holder 2 has a thickness t1 in the focusing direction F at its portion where the objective lens 1 is mounted. On the other hand, in an available magnetic field of the magnetic circuit, the lens holder 2 has a thickness t2 in the focusing direction F such that the thickness t1 is smaller than the thickness t2. Therefore, the objective lens 1 and the reflective mirror 10 can be brought closer to each other and thus, the optical head as a whole has a small thickness. The objective lens 1 is disposed at an approximately central portion of the substantially U-shaped lens holder 2 and the permanent magnets 3a and 3b for driving the lens holder 2 are provided at the opposite end portions of the lens holder 2. Therefore, the center of the driving force for driving the lens holder 2 is coincident with the center of the objective lens 1. As a result, the objective lens actuator K1 has a stable frequency response free from the adverse effects which arise when the center of the driving force deviates from center of gravity of the movable member.

Figure 7:
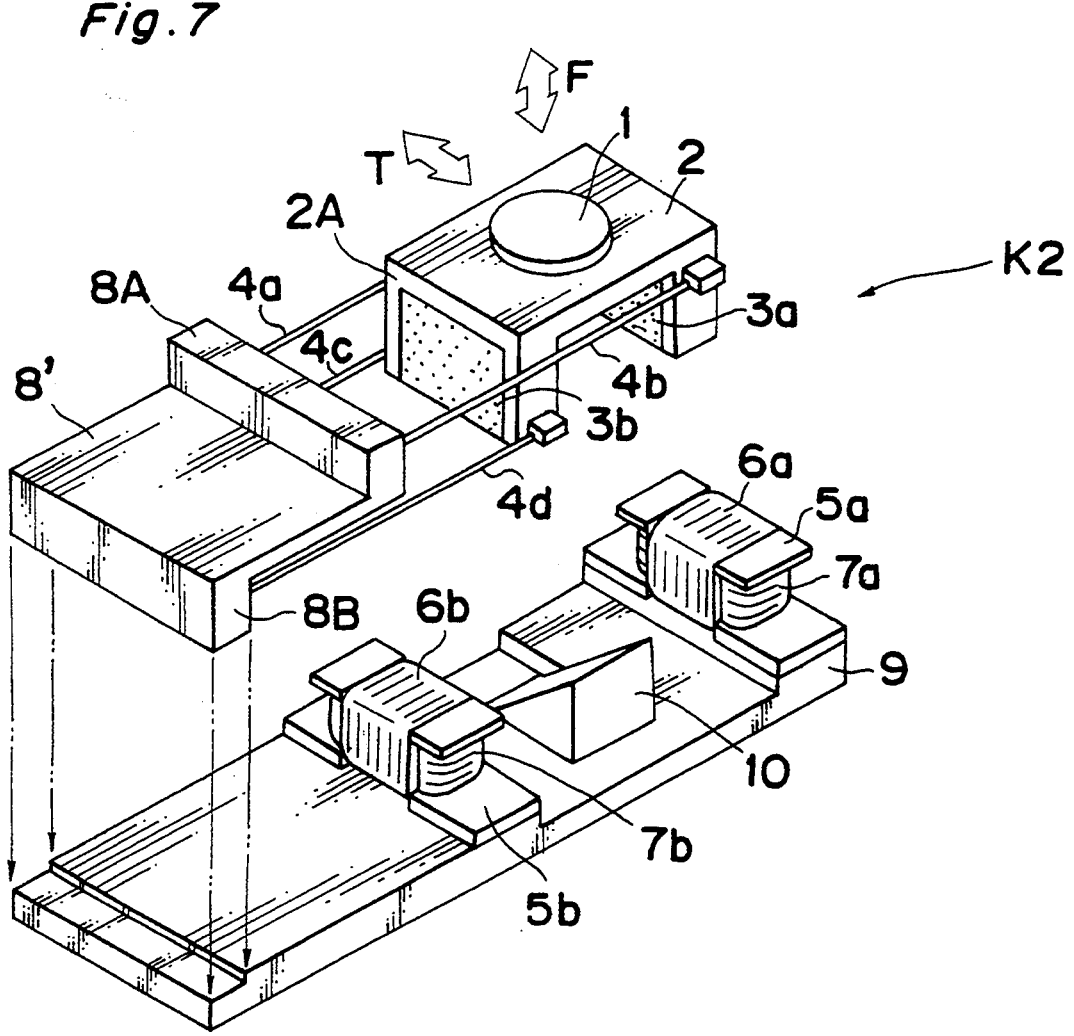
FIG. 7 is an exploded perspective view of a second embodiment of an objective lens actuator according to the present invention.

FIG. 7 shows a second embodiment of an objective lens actuator K2 according to the present invention. The objective lens actuator K2 includes a stationary member 8' having an upper flange 8A and a lower flange 8B which confront the end 2A of the lens holder 2. The upper flange 8A is disposed nearer to the end 2A than the lower flange 8B. The wires 4a and 4b each have one end fixed to the upper flange 8A, while the wires 4c and 4d each have one end fixed to the lower flange 8B. The other end of each of two of the wires 4a, 4b is attached to the proximal portion of a second leg of the lens holder 2 remote from the base member. The other end of each of the other two wires 4c, 4d is attached to the distal portion of the first leg of the lens holder 2. That is, because the wires 4a to 4d have identical lengths, the positions at which the wires 4a and 4b are attached to the lends holder 2 are disposed farther away from the end 2A than the positions at which the wires 4c and 4d are attached to the lens holder 2. Because the remaining structure of the objective lens actuator K2 is similar to that of the objective lens actuator K1, a description thereof is omitted for the sake of brevity.

With this objective lens actuator K2, forces for restraining rotations of the movable member about axes parallel to the focusing direction F and the tracking direction T are increased and parasitic resonance is least likely to appear in frequency response. Meanwhile, even if the lens holder 2 has been displaced in the focusing direction F, the wires 4a and 4b are so set as not to intercept a light beam incident upon the reflective mirror 10.

In accordance with the second embodiment of the present invention, the optical head as a whole can be relatively thin and the objective lens actuator has a stable frequency response free from parasitic resonance.

Figure 8:
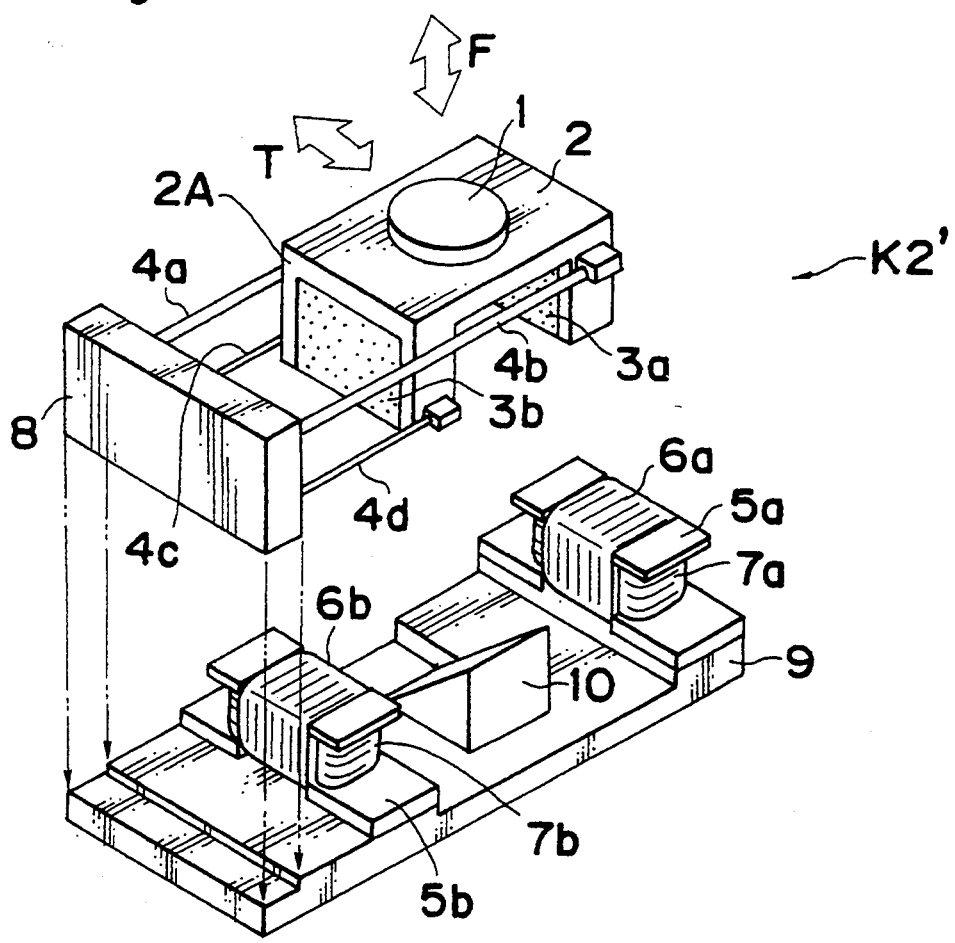
FIG. 8 is a view similar to FIG. 7, particularly showing a modification of the second embodiment.

FIG. 8 shows a modification K2' of the objective lens actuator K2. In the modified objective lens actuator K2', the wires 4a and 4b are longer than the wires 4c and 4d but the wires 4a to 4d can be attached to the platelike stationary member 8. To this end, the wires 4a and 4b have larger diameters than the wires 4c and 4d as shown in FIG. 8 or the material of the wires 4a and 4b is different from that of the wires 4c and 4d. Because the remaining structure of the modified objective lens actuator K2' is similar to that of the objective lens actuator K2, a description thereof is omitted for the sake of brevity.

With this modified objective lens actuator K2', since positions at which the wires 4a to 4d are fixed to the stationary member 8 lie in common plate perpendicular to the longitudinal direction of the wires 4a to 4d, the objective lens actuator can be made more compact than the actuator K2.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. An objective lens actuator for use in positioning an objective lens to optically write information on or read information from a disklike recording medium, said objective lens actuator comprising:

a substantially U-shaped lens holder having opposite first and second legs, each of said legs including a proximal portion at which the leg extends from the remainder of the lens holder and a distal portion forming a terminal end of the leg, the objective lens being supported by said lens holder at a portion thereof located approximately centrally of said leg portions, said U-shaped lens holder and the objective lens constituting a movable member;

a base member, said first leg of the lens holder being located between said base member and said second leg of the lens holder; and four rodlike elastic members extending longitudinally substantially parallel to one another and supporting the movable member, one end of each of two of said elastic members being attached to the lens holder at the distal portion of said first leg thereof, one end of each of the other two of said elastic members being attached to the lens holder at the proximal portion of said second leg thereof, and the other end of each of said four rod-like elastic members being fixed to said base member at fixing locations on only one side of said U-shaped lens holder such that the movable member is movable in a focusing direction and a tracking direction orthogonal to each other and to the direction in which said elastic members extend longitudinally, whereby rotations of said U-shaped lens holder about said focussing direction and said tracking direction are inhibited and parasitic resonance is prevented.

2. An objective lens actuator as claimed in claim 1, wherein said fixing locations all lie in a common plane perpendicular to the direction in which the elastic members extend longitudinally parallel to one another, and wherein said elastic members have identical spring constants.

3. An objective lens actuator as claimed in claim 2, wherein said other two of the elastic members fixed to the proximal end of said second leg each have diameters greater than the diameters of each of said two elastic members fixed to the distal end of said first leg.

* * * * *